United States Patent
Milici et al.

(10) Patent No.: US 7,829,127 B2
(45) Date of Patent: Nov. 9, 2010

(54) FORTIFICATION OF SYRUP WITH CALCIUM AND OTHER MINERALS AND VITAMINS

(75) Inventors: Joseph Milici, Mount Joy, PA (US); Mary Ellen Kline, Lancaster, PA (US); Malathy Nair, Hummelstown, PA (US)

(73) Assignee: The Hershey Company, Hershey, PA (US)

( * ) Notice: Subject to any disclaimer, the term of this patent is extended or adjusted under 35 U.S.C. 154(b) by 867 days.

(21) Appl. No.: 11/387,386

(22) Filed: Mar. 23, 2006

(65) Prior Publication Data

US 2006/0216376 A1   Sep. 28, 2006

Related U.S. Application Data

(60) Provisional application No. 60/665,311, filed on Mar. 25, 2005.

(51) Int. Cl.
*A23L 1/08*   (2006.01)

(52) U.S. Cl. ............... 426/74; 426/72; 426/267; 426/103; 426/658; 426/589; 426/806; 426/573; 426/311; 426/593

(58) Field of Classification Search .............. None
See application file for complete search history.

(56) References Cited

U.S. PATENT DOCUMENTS

| | | | | |
|---|---|---|---|---|
| 4,784,871 A | * | 11/1988 | Park | 426/583 |
| 5,194,288 A | * | 3/1993 | Peterson | 426/658 |
| 5,445,837 A | * | 8/1995 | Burkes et al. | 426/74 |
| 6,077,557 A | * | 6/2000 | Gordon et al. | 426/573 |
| 6,241,997 B1 | * | 6/2001 | Kershman et al. | 424/440 |
| 6,773,744 B1 | * | 8/2004 | Ward et al. | 426/659 |
| 2006/0165759 A1 | * | 7/2006 | Chaudhari et al. | 424/440 |

* cited by examiner

*Primary Examiner*—Jennifer C McNeil
*Assistant Examiner*—Hong Mehta
(74) *Attorney, Agent, or Firm*—Scully, Scott, Murphy & Presser, P.C.

(57) ABSTRACT

A calcium fortified syrup is disclosed which provides between 10-70% of the US RDI of calcium per 2 tablespoonfuls. The calcium remains uniformly dispersed and the product has no harsh off-notes or bitter after taste.

19 Claims, No Drawings

FORTIFICATION OF SYRUP WITH CALCIUM AND OTHER MINERALS AND VITAMINS

CROSS REFERENCE TO RELATED APPLICATION

The present application claims benefit of U.S. Provisional Application No. 60/665,311 filed on Mar. 25, 2005.

FIELD OF THE INVENTION

This invention relates generally to a calcium fortified syrup, and more particularly, to a syrup fortified with micronized calcium, especially micronized tricalcium phosphate.

BACKGROUND OF THE INVENTION

Calcium is essential for building and maintaining bone strength, nerve transmission to the muscles, serving as a catalyst for the conversion of prothrombin to thrombin and activating a number of enzymes including lipase. Calcium deficiency can lead to osteoporosis in the elderly. Additionally, protection against high blood pressure and colon cancer have been attributed to calcium. The U.S. Recommended Daily Allowance, commonly referred to as the Reference Daily Intake ("RDI"), of calcium is 1000 mg for adults and children 12 or more years of age.

Calcium and other minerals and vitamins have been used to fortify foods to obtain general health benefits. To get enough calcium for growing bones, the percent Daily Value for calcium should add up to 120 percent. Foods fortified with calcium are considered to offer the same net effect as calcium naturally found in food.

Dairy products are recognized as a rich source of dietary calcium. Both milk and ice cream have been fortified with calcium. Calcium fortification of milk is disclosed in U.S. Pat. Nos. 2,871,123, 4,701,329, 4,840,814 and 4,851,243; see also Anon, Boosting Milk's Calcium, 99 Dairy Foods 36, 1998. For example, milk has been fortified with calcium carbonate, calcium gluconate and milk calcium in powdered form.

U.S. Pat. No. 5,002,779 to Mehansho describes addition of calcium to dry chocolate powers such as cocoa. Carrageenan gum has been used for suspension of calcium carbonate. U.S. Pat. Nos. 4,701,329 and 4,851,243 disclose calcium-enriched and phosphorus-enriched fortified milk by the addition of tri-basic calcium phosphate, carrageenan and guar gum to milk. The hydration of the gums is necessary to assure uniform distribution of the added materials in the milk.

However, there are many obstacles associated with adding calcium to syrups that make it very difficult to utilize. For example, when added directly to syrup as a salt without being subjected to any further treatment, many of the calcium salts, which are insoluble or substantially insoluble at around neutral pH, e.g., calcium carbonate, calcium phosphates, calcium citrate and other organic or inorganic acid salts of calcium, precipitate out of the syrup or impart to the syrup a gritty chalky mouthfeel. Fortification with calcium is a significant challenge, especially in foods, such as syrups, which are ingested in small serving sizes. Syrups are packaged in standard 24 ounce bottles which include approximately 16 servings per bottle. The smaller serving size and the higher number of servings in a container for syrups is a problem since a high concentration of calcium is necessary in the small volume if it is being used to fortify this food. Also problematic is the availability of calcium from various salt ingredients. Typically, the amount of calcium in various salt forms only ranges from 20-40% based on the source.

An additional problem with calcium fortification is that most calcium sources, such as calcium carbonate, have a very poor solubility in water or in neutral pH solutions. Calcium that is very soluble in orange juice, for example, will not be soluble in chocolate syrup. Syrups are typically low water mixtures, that is, there is not a lot of available water. This poor solubility coupled with low water availability in syrups prevents calcium from becoming soluble in the system. When incorporating calcium into liquids, the source of calcium is usually in finely divided form which further promotes precipitation thereof upon extended storage.

Syrups are products which typically are expected to have much longer shelf lives than products such as milk or yogurt. The addition of untreated calcium salts to syrups causes the syrup to have a gritty texture; moreover sedimentation of calcium on the bottom of the container is likely to occur during processing and/or shelf life. More soluble calcium salts or even the use of suspended sources of calcium tends to result in off flavors, adverse appearance, and undesirable increases in viscosity. Generally, the more soluble the salt or the more finely divided it is so as to improve supendability, the quicker or more easily the off-taste will be detected. Also, solubilization of the calcium increases the likelihood of it being complexed with or interacting with other components of the syrup or other foods consumed with it. Additionally, complexation or interaction of the calcium may result in it being less susceptible to absorption in the blood.

Therefore, there is a need for a calcium fortified syrup which is flavor neutral and not unpleasant tasting or gritty and from which the calcium does not separate out.

SUMMARY OF THE INVENTION

It is an object of the present invention to fortify syrup with calcium.

It is also an object of the present invention to fortify syrup product with calcium, with a high concentrations of calcium so that one serving provides at least 10% of the RDI while maintaining a calcium suspension and preventing and/or retarding separation of calcium therefrom.

It is yet another object of the present invention to fortify syrup with calcium where the calcium is flavor neutral and is not unpleasant tasting or gritty.

Fortification of syrup with calcium is advantageous. Syrup is consumed with milk or ice cream. Research shows that the Vitamin D in milk greatly aids the bioavailability and absorption of calcium in the body. Therefore, it is an object of the present invention to have synergistic absorption of calcium from a syrup consumed together with a dairy product.

Other objects, features, advantages of the invention shall become apparent as the description thereof proceeds when considered in connection with the accompanying examples.

DETAILED DESCRIPTION OF THE INVENTION

In accordance herewith, the present invention is directed to a calcium fortified syrup in which the calcium is present as a micronized calcium salt. Preferably, the pH of the syrup ranges from about five to about eight. Examples of calcium supplemented syrup products prepared in accordance with the present invention include any flavored syrup, such as chocolate syrup, fruit-flavored syrups, i.e., strawberry syrup, raspberry syrup, blueberry syrup, cherry syrup, and the like, butterscotch syrup, caramel syrup, maple syrup, and the like. The type of syrup products provided herein are for illustrative purposes only and are not meant to be an exhaustive list. The preferred syrup is chocolate syrup.

Fortification of syrups is difficult because syrups are characterized by a low amount of formula water, i.e., about 25%. Moreover, there is a high competition for that water from other dissolved solids such as sugars, salts and in chocolate syrups, cocoa as well as the high amount of calcium required to meet even a 10% label requirement, i.e., about 1-2% by weight of the product. Moreover, it is extremely difficult for the syrup to achieve a level of calcium at concentrations of 10% or more of the RDI since very little syrup is used per serving. For example, only a small amount of chocolate syrup is added to milk or chocolate poured over ice cream per serving. A small amount of maple or fruit syrup is poured over such foods as pancakes, waffles or french toast and the like. However, the objective of the present invention is for the syrup to contain at least 10% of the RDI. of calcium per serving, and more preferably from about 10% to about 70% of the RDI of calcium per serving, and even more preferably from about 10% to about 40% of calcium per serving and most preferably from about 10% to about 20% of the RDI of calcium per serving size.

Serving as used herein is a term of art, but varies with the type of product or its use. The Nutrition Labeling and Education Act of 1990 standardized the serving size of syrup milk modifiers and ice cream toppings to two tablespoons. With typical product densities, this is equivalent to about 35 grams to about 40 grams of syrup per serving.

Thus, unless indicated to the contrary, as used herein, the serving size is 2 tablespoons. It is preferred that the syrups of the present invention contains about 100 mg to about 700 mg of calcium per two tablespoons, and more preferably about 100 mg to about 400 mg calcium per two tablespoons, and even more preferably from about 100 mg to 300 mg calcium per two tablespoons, most preferably from about 100 mg to about 200 mg calcium per two tablespoons.

Calcium can add a bitter flavor, necessitating the use of flavors to mask calcium fortification. The present invention fortifies syrups such as chocolate syrup, for example with calcium that is flavor neutral. The present invention has a distinct pleasant aftertaste and substantially no gritty mouthfeel. Thus, it is not necessary to include a flavor mask. However, optionally, if one desires, a flavoring agent may be added to the syrup, as described hereinbelow.

However, the present inventors have found that if the calcium source, i.e., calcium salts, is significantly reduced in size into a fine powder on the order of micrometers, they were able to overcome the aforesaid problem. Preferably, the calcium salt is reduced to a size having a mean diameter of 0.1 to about 10 µm in size and more preferably from about 0.5 to about 5 µm. By reducing the size of the particles of the calcium salt, the inventors have found that more calcium can be suspended in the syrup, and the shelf life of the product is longer.

The calcium salts can be subjected to any techniques known in the art that reduces the size of the particles therein into the micrometer range. As used herein, the term "micronized calcium" refers to the calcium when particles have been reduced to the size on the order of micrometers, as described herein. It is preferred, however, that a micronizer is used to reduce the size of the particles. The use of calcium salt with a reduced particle size, especially calcium salts micronized by a micronizer, in the syrup retards the rate that the calcium salt will separate from the syrup.

The source of calcium for providing calcium fortification for the syrup of the present invention is preferably a tasteless calcium salt which does not adversely affect flavor or texture of the syrup. The syrup may contain one or more calcium salts. Preferred calcium salts are calcium carbonate, calcium phosphate, e.g., calcium monophase, calcium diphosphate, calcium triphosphate, calcium ascorbate, calcium chloride, calcium citrate, calcium gluconate, calcium glycerophosphate, calcium hydroxide, calcium maleate, calcium hydrogen maleate, calcium lactate, calcium oxide, and the like. It is preferred that the calcium is present in a salt wherein the relative molar ratio of calcium to the anion per molecule in at least 1:1. For example, in calcium carbonate, $CaCO_3$, the relative molar ratio of $Ca^{2+}$ to $CO_3^{2-}$ is 1:1 while in $Ca_3(PO_4)_2$, the relative molar ration of $Ca^{2+}$ to $PO_4^{3-}$ is 1.5:1. The preferred calcium salts are calcium carbonate and calcium phosphate. Calcium phosphate is the most preferred calcium component for fortification of the syrup. Calcium phosphate is generally available as a mono basic salt $Ca(H_2PO_4)_2$, dibasic salt $CaHPO_4$ or tribasic salt $Ca_3(PO_4)_2$. Especially preferred for use herein is tricalcium phosphate, because of its high weight percentage of calcium (about 38%). Thus, in a preferred embodiment, the calcium contained in the syrup of the present invention is micronized tricalcium phosphate.

The use of the reduced size of calcium particles, especially micronized calcium, e.g., as tricalcium phosphate, facilitates the calcium fortification of the syrup without imparting a gritty texture thereto and without causing calcium precipitation from the syrup and/or calcium sedimentation on the bottom of the syrup. The micronized particles of the calcium salt, e.g., tricalcium phosphate, coupled with the viscosity of the syrup base keep the particles in suspension and uniform in the product. That is, the inventors have discovered that the use of a very small particle size (in the micron range) for the calcium particle keeps the calcium in suspension in a homogeneous manner throughout the syrup bottle for an acceptable period of time.

As discussed hereinabove, the use of micronized calcium extends the shelf life of the syrup relative to a syrup containing calcium salts wherein the calcium has not been subjected to further treatment. That is, relative to syrups in which the calcium salts have not been treated, the calcium in the syrups of the present invention tend to remain in the syrup without precipitating out or sedimenting for a much larger period of time.

Moreover, the use of micronized calcium salts, wherein the calcium is present in at least a 1:1 molar ratio relative to the anion, affords an additional advantage. The Nutrition Labeling and Education Act standardized the serving size of chocolate syrup to 2 tablespoons (e.g., about 39 grams). Whereas a beverage such as milk or orange juice has a serving size of 8 fluid ounces or about 275 grams, the serving size of syrup according to the Nutrition Labeling Education Act is two tablespoons per serving. However, when utilized, a consumer may utilize more or less than two tablespoons of syrup per serving, e.g., on a topping, e.g., on cakes, ice cream, pies, or other foods or in a beverage, e.g., milk, and the like. For example, the consumer may utilize 1, 1.5, 2, 2.5, 3, or more tablespoons of the syrup per serving. Thus, the syrup used in the present invention may be utilized in any amount per serving. Preferably, the consumer will utilize one, two or three tablespoons of the syrup per serving. The two tablespoon serving discussed herein is used solely for purposes of standardization. Nevertheless, in two tablespoons, for the syrup to have the same amount of calcium in a serving size relative to the serving size of milk or orange juice, the calcium would have to be present in an amount of about 7 times more in a serving of chocolate syrup versus a serving of milk or orange juice.

The present invention overcomes the small serving size and, therefore, the calcium concentration factor by the use of such micronized calcium salts. The use of such micronized calcium salts, such as tricalcium phosphate as the source of calcium, reduces the amount of fortifying calcium required. For example, tricalcium phosphate contains almost 40% calcium which is higher than most sources of calcium and almost double that of the calcium maleate. In a preferred embodiment, the calcium fortified syrup according to the present invention contains about 0.5 % to about 4% by weight of the calcium.

A standard 24 ounce bottle of chocolate syrup contains over 17 servings. Separation of a small amount of precipitated calcium will concentrate on the floor of the container resulting in a concentrated amount in the last few servings in the container. This impacts product performance. The present invention eliminates precipitation of calcium. The present invention overcomes the small serving size and, therefore, the calcium concentration factor by suspending the calcium.

The present invention also negates the pH related solubility issues with calcium in syrup, e.g., chocolate syrup, by suspending and not dissolving the calcium.

The calcium fortified syrup of the present invention exhibits good solid distribution. Both particle size and viscosity are controlled to minimize separation and collection on the floor of the container.

A suspending agent is added to the syrup in a preferred embodiment to aid in maintaining the uniformity of the composition. The incorporation of suspending or thickening agents suspends the calcium and controls viscosity. Examples of suitable suspending or thickening agents that can be utilized in the syrups of the present invention include xanthan gum, guar gum, polysaccharides, such as starch, cellulose (e.g., microcrystalline cellulose) and carrageenan, and polyuronides, such as pectin. Gelatin is another example of a suspending agent which may be used in the present syrup compositions. Xanthan gum is the preferred suspending agent and is preferably the agent is present in a thickening effective amount. It is preferred that if it is present, the suspending agent is present in an amount of from about 0.01% to about 0.2%, and preferably 0.03% to about 0.07% by weight of the syrup.

The syrup of the present invention also may contain a sweetening effective amount of a sweetener. The sweetener that is used is the one that is typically used in the art in syrups. The sweetener is preferably one or more nutritive carbohydrate sweeteners or one or more high potency sweeteners or a mixture thereof. Examples of nutritive sweeteners that can be include are but are not limited to sucrose, dextrose, fructorse, lactose, maltose, glucose, syrup solids, corn syrup solids, invert sugar, hydrolyzed lactose, honey, maple syrup, brown sugar, molasses and the like. When present, the nutritive carbohydrate sweetener is present in amounts preferably ranging from about 25% to about 75% and more preferably from about 50% to about 70% by weight of the syrup.

Examples of high potency sweeteners include aspartame, cyclamates, saccharin, acesulfame, such as acesulfame-K, neohesperidine, dihydrochalcone, sucralose, alitame, stevia sweeteners, glycyrrhizin, thaumatin, and the like. These are also present in sweetening effective amounts. Preferably, if present, it is present in amounts ranging from about 50 ppm to about 100 ppm of the syrup and more preferably from about 100 ppm to about 500 ppm by weight of the syrup.

Vitamins, minerals, cholesterol reducing agents, and other nutrients, may additionally be present. For example, Vitamin D, Vitamin E, biotin, panothenic acid or salt thereof, zinc or salt thereof, soy, plant sterols, anti-oxidants, omega 3-fatty acids, and the like, may be added to the syrups of the present invention. In addition, they may be present in the salt form, whenever commercially available.

In addition, flavoring such as vanillin and other ingredients known to those in the art of manufacture of syrups may be added. Flavors other than vanillin may also be used. A complete listing of flavors that may be used in the present invention are found in standard references such as George A. Burdock, Fenaroli's Handbook of Flavor Ingredients, 4 th ed., CRC Press, 2002, the contents of which are incorporated by reference herein. Each of these additional ingredients, flavoring, vitamins, minerals, nutrients, and the like, if present, is present in amounts of preferably less than about 1%, preferably from about 0.001 to about 1% of the syrup by weight. In addition, the syrups of the present invention may contain preservatives which are present in amounts effective to retard spoilage. Examples include sorbate salts, such as potassium sorbate.

The syrups of the present invention may also be reduced calorie (i.e., lite) or reduced carbohydrate (i.e., low carb). The syrups of the present invention may also be reduced fat or fat free or sugar free.

The calcium fortified syrup of the present invention has a viscosity typically found in syrups.

The calcium fortified syrups of the present invention are prepared in accordance with conventional methods, except that micronized calcium salt is added thereto. Although the syrup may be prepared by a continuous or batch process, it is preferred that it is prepared by a batch process. The micronized calcium may be added at any stage of the process, but preferably the calcium is added at the beginning of the process, e.g., at the beginning of the batch process. Syrups contain relatively little available water and so the micronized calcium is preferably added directly to the small amount of free water prior to the addition of large volumes of soluble sugar solids. The essentially insoluble micronized calcium salt is more easily dispersed in the water prior to the addition of other ingredients. The other ingredients in the syrup are then added preferably batchwise, and mixed thoroughly with the micronized calcium. The mixing is effected under conditions sufficient for the ingredients, but especially the micronized calcium, to be as evenly distributed as possible within the syrup.

The present invention is explained in greater detail by reference to the following examples, but the present invention should not be construed as limited thereto. The invention will now be further illustrated by the following examples.

EXAMPLE 1

Syrups containing micronized tricalcium phosphate standardized to a viscosity of 400 cps. were evaluated. For comparison a syrup containing calcium maleate (untreated) standardized to a viscosity of 400 cps was used. Both syrups contained 10% DV calcium (0.1 grams calcium per 39 gram serving size). The syrups were centrifuged to force separation of calcium. The supernatants were collected and analyzed for calcium.

Table I shows 8.3% separation at 1000 rpm calcium and 27.8% separation at 2000 rpm for calcium maleate. For tricalcium phosphate there was no separation at 1000 rpm and only 8.7% at 2000 rpm.

TABLE I

| Percent Separated | Syrup with Calcium Maleate | Syrup with Micronized Tri-Calcium Phosphate |
|---|---|---|
| 5 min. at 1000 RPM Calcium (mg/100 g) | 8.3% | 0.0% |
| 5 min. at 2000 RPM Calcium (mg/100 g) | 27.8% | 8.7% |

EXAMPLE 2

Three centrifuge methods, of increasing severity, were used for calcium maleate and tricalcium phosphate. The results as shown in Table 2 below show greater separation of calcium maleate than tricalcium phosphate. Even at the most extreme centrifugation, the amount precipitated from the micronized tricalcium phosphate was 28.4% versus 37.3% for calcium maleate.

TABLE 2

| Percent Separated | #2 Syrup with Calcium Maleate | #4 Syrup with Micronized Tri-Calcium Phosphate |
|---|---|---|
| Baseline Calcium (mg/100 g) | 324.0 | 289.0 |
| 5 min. at 1000 RPM Calcium (mg/100 g) | 297.0 | 289.0 |
| 5 min. at 2000 RPM Calcium (mg/100 g) | 234.0 | 264.0 |
| 5 min. at 4000 RPM Calcium (mg/100 g) | 203.0 | 207.0 |
| Baseline Calcium (mg/100 g) | | |
| 5 min. at 1000 RPM Calcium (mg/100 g) | 8.3% | 0.0% |
| 5 min. at 2000 RPM Calcium (mg/100 g) | 27.8% | 8.7% |
| 5 min. at 4000 RPM Calcium (mg/100 g) | 37.3% | 28.4% |

Unless indicated to the contrary, all percentages are by weight. Also, weight percentages of the syrup are by weight of the syrup, and include the weight of the water present therein. Moreover, unless indicated to the contrary, reference to the amount of calcium present in a composition, means the % by weight of the calcium without the associated counterion.

While there is shown and described herein certain specific compositions embodying the invention, it will be manifest to those skilled in the art that various modifications may be made without departing from the spirit and scope of the underlying inventive concept and that the same is not limited to the particular forms herein described except insofar as indicated by the scope of the appended claims.

What is claimed is:

1. A calcium fortified syrup comprising:
   (a) a syrup comprising sugar; and
   (b) micronized calcium salt suspended in the syrup, said calcium of the salt being present in said syrup in an amount ranging from about 100 mg to about 700 mg per two tablespoons, wherein the pH of said calcium fortified syrup ranges from about 5 to about 8.

2. The calcium fortified syrup according to claim 1 wherein the calcium salt is selected from the group consisting of calcium acetate, calcium ascorbate, calcium chloride, calcium citrate, calcium gluconate, calcium glycerophosphate, calcium hydroxide, calcium maleate, calcium hydrogen maleate, calcium carbonate, calcium lactate, calcium oxide, calcium pantothenate, and calcium phosphate or mixture thereof.

3. The calcium fortified syrup according to claim 1, wherein the calcium salt is selected from the group consisting of calcium phosphate and calcium carbonate.

4. The calcium fortified syrup according to claim 1 wherein the calcium phosphate is calcium monophosphate, calcium diphosphate or calcium triphosphate.

5. The calcium fortified syrup according to claim 1, wherein the calcium salt is tricalcium phosphate.

6. The calcium fortified syrup according to claim 1 wherein the percentage of calcium present therein ranges from about 0.5% to about 4% by weight.

7. The calcium fortified syrup according to claim 1 wherein the amount of calcium ranges between about 100 mg to about 200 mg of calcium per two tablespoons.

8. The calcium fortified syrup according to claim 1 wherein the calcium salt is comprised of calcium particles having a mean diameter ranging from 0.1 μm to about 10 μm.

9. The calcium fortified syrup according to claim 8 wherein the mean diameter of the calcium particles ranges from about 0.5 μm to about 5 μm.

10. The calcium fortified syrup according to claim 1, further comprising vitamins and minerals, and nutrients.

11. The calcium fortified syrup according to claim 10, wherein said suspending agent is selected from the group consisting of xanthan gum, guar gum, polysaccharides, starch, cellulose, microcrystalline cellulose, carrageenan, polyuronides, gelatin and pectin or mixture thereof.

12. The calcium fortified syrup according to claim 11 where the xanthan gum is present in an amount from about 0.01% to about 0.2%.

13. The calcium fortified syrup according to claim 1, further comprising a suspending agent.

14. The calcium fortified syrup according to claim 13, wherein the suspending agent is xanthan gum.

15. The calcium fortified syrup according to claim 14 where the xanthan gum is present in an amount from about 0.03% to about 0.07%.

16. The calcium fortified syrup in accordance with claim 1 wherein the syrup is chocolate syrup, fruit flavored syrup, maple syrup, butterscotch syrup, or caramel syrup.

17. The calcium fortified syrup according to claim 1 wherein the syrup is chocolate syrup.

18. The improved syrup product of claim 17 wherein the micronized calcium salt is micronized calcium triphosphate.

19. In an improved syrup product, wherein the product comprises said syrup comprised of sugar, the improvement comprising said syrup containing micronized calcium salt suspended in the syrup, said micronized calcium salt being present in an amount sufficient to contain at least 100 mg of calcium per two tablespoons of syrup, the pH of said improved syrup product ranging from about 5 to about 8.

* * * * *